United States Patent Office 2,872,133
Patented Feb. 3, 1959

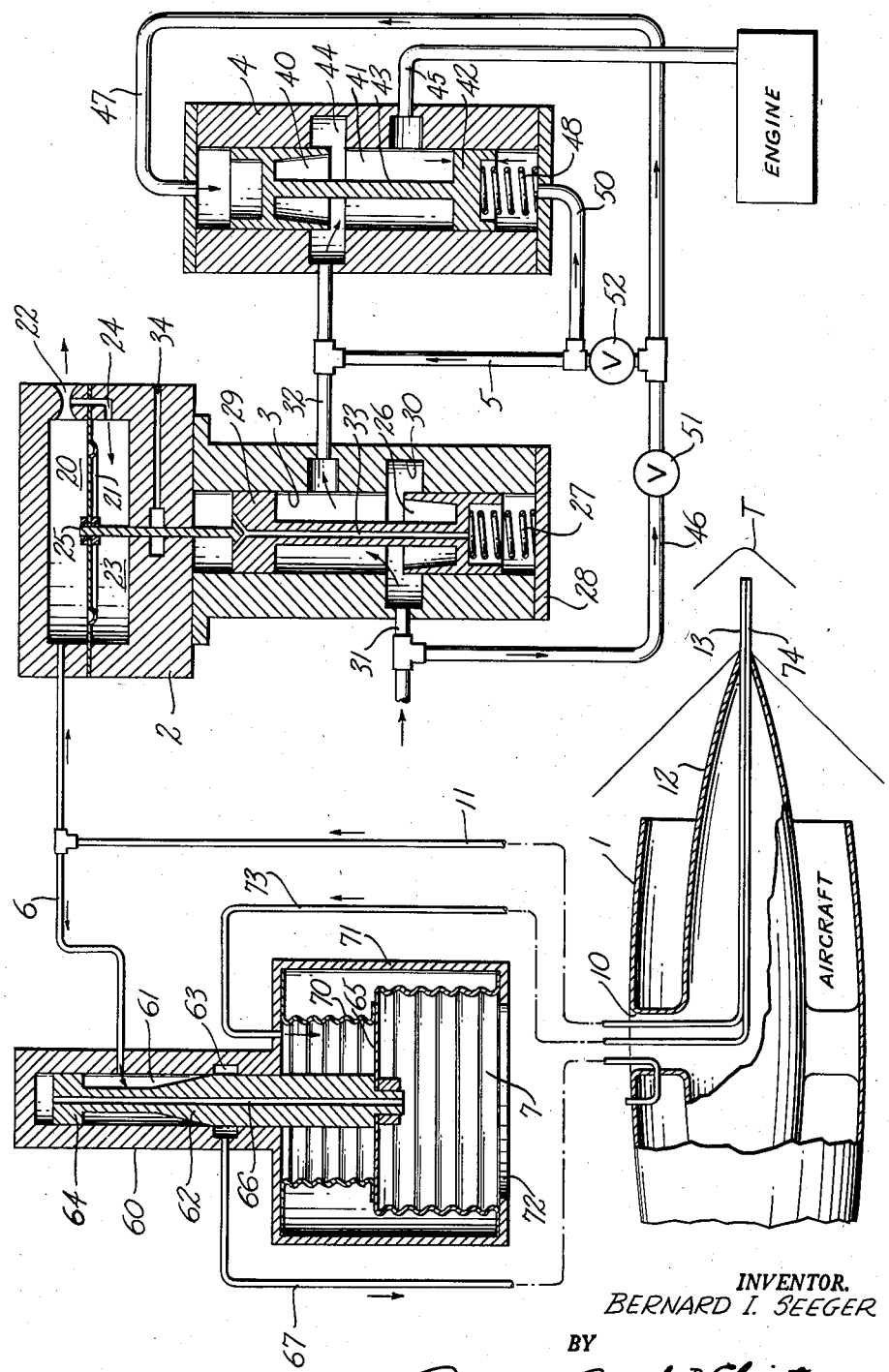

2,872,133

AUTOMATIC FUEL CONTROLS FOR REGULATING AIRCRAFT MACH NO. IN ACCORDANCE WITH CHANGE OF ALTITUDE

Bernard I. Seeger, Seattle, Wash., assignor to Boeing Airplane Company, Seattle, Wash., a corporation of Delaware Application October 2, 1953, Serial No. 383,813

9 Claims. (Cl. 244—76)

The present invention provides control mechanism operable automatically to vary the fuel supply to an aircraft engine for regulating the Mach No. of the aircraft in accordance with a predetermined pattern as its altitude varies. Such pattern may require an increase in airplane Mach No. as the altitude increases, or a decrease in Mach No. of the airplane as the altitude increases, or it may be preferred that the Mach No. of the airplane remain constant irrespective of variation in altitude.

It is a principal object of the present invention to provide control mechanism for regulating the Mach No. of an airplane in accordance with changes of altitude automatically, which is of simple construction, light in weight, and reliable in operation. Its operation will not be altered by changes in fuel line pressure.

More specifically, it is an object to incorporate in such control mechanism altitude sensitive means and Mach No. sensitive means which cooperate in the control of the supply of fuel to the engine so that for any given altitude, if the Mach No. tends to increase over the predetermined Mach No. corresponding to such altitude, the supply of fuel to the engine will be decreased, and, conversely, if the Mach No. of the airplane tends to drop below the predetermined speed corresponding to such selected altitude, the supply of fuel to the engine will be increased. Consequently, the Mach No. of the airplane for such selected altitude will be maintained at the predetermined Mach No. within close limits.

A further object is to enable the Mach No. characteristics of the control mechanism as related to altitude to be altered or selected easily by utilizing the same general type of mechanism for controlling the airplane Mach No. in accordance with different schedules. This object is accomplished by providing simple altitude sensitive means and Mach No. sensitive means which can be replaced easily to provide alternate types of Mach No. control, either in selecting control mechanism for the purpose of establishing the Mach No. performance of a particular airplane, or of enabling the Mach No. and altitude schedule of a given airplane to be altered from time to time depending upon the requirements for a particular mission.

While the control mechanism of the present invention could be utilized for controlling the Mach No.'s of airplanes of various types, it is particularly well adapted for controlling the supply of fuel to jet engines of an airplane which will fly at or above sonic velocities.

The foregoing objects can be accomplished by utilizing mechanism which includes a combination of two bellows, one subjected to static ambient air pressure, and therefore constituting altitude sensitive means, and the other bellows subjected to impact air pressure varying with the Mach No. of the airplane, and therefore constituting Mach No. sensitive means. The relative sizes of these bellows, their resiliency and their manner of interconnection may be varied so that they will cooperate to control the supply of fuel to the airplane engine so as to maintain a predetermined schedule of airplane Mach No. to airplane altitude relationship. Such bellows combination is controllably connected to fuel supply regulating means sensitive to changes in Mach No. and altitude the delivery of fuel from which is unaltered by a change in fuel source pressure.

The drawing illustrates the preferred form of automatic control mechanism, somewhat diagrammatically, the several components being illustrated in section.

In the drawing the Mach No. and altitude sensitive mechanism of the control is illustrated as being connected to operate a fuel flow regulator powered by impact or ram air pressure. Since the present control will frequently be used in aircraft flying in the sonic or supersonic speed range, the apparatus has been shown as controlling such an aircraft which is driven by ramjet engines. The housing 1 for such an engine constitutes an integral part of the aircraft, and may bear any desired relation to it as far as the present invention is concerned. The control mechanism is shown as connected to this housing through a duct 10 in the side of it, but it should be understood that the control mechanism may be located within the housing or in any other convenient portion of the airplane communicating through the aperture 10 with such housing.

The fuel flow regulator portion of the control mechanism may be powered by impact or ram air supplied to the regulator through the tube 11 passing through the aperture 10 extending forward through a central cowling 12 within the housing 10, and having an open end portion 13 projecting forwardly of the cowling 12. Such a ram air probe could be mounted on any other portion of the airplane in which it would be subjected to the impact of air through which the airplane passes unaffected by movement through the air of other portions of the aircraft. Such a constant source of air pressure or source related accurately to the speed of the airplane is necessary in order to obtain the most consistent and accurate operation of the control mechanism.

Air under pressure, supplied by the probe 13, flows through the conduit 11 to the primary fuel flow regulating unit 2. Such air flows into the chamber 20 at one side of the pressure actuated diaphragm 21, and is discharged from such chamber through the venturi shaped aperture 22. Between the throat of this venturi aperture and the chamber 23, at the opposite side of the diaphragm 21, is a duct 24 through which air will flow into or out of chamber 23 to establish in it a pressure substantially lower than the pressure in chamber 20, but related to it. The relationship of the pressures in chambers 20 and 23 will depend upon the design of the venturi 22 and the supply of air through conduit 11 to the chamber 20. The more air supplied to chamber 20 by conduit 11, and consequently the faster air will flow from it through venturi 22, the greater will be the difference in pressure between the pressure in chamber 20 and that in chamber 23.

The pressure difference acting on opposite sides of diaphragm 21, because of the difference in pressures in chambers 20 and 23, will produce on stem 25 connected to diaphragm 21 a force tending to move toward open position the valve 26 carried by this stem. Opposing such valve movement is a spring 27 reacting between the valve 26 and the end 28 of the unit 2 remote from the pneumatic servomotor diaphragm 21. In order to avoid bending of the valve stem by the action of the opposing axial forces upon it, a guide boss 29 is provided on its central portion which has sliding engagement with the walls of the valve chamber 3. In this chamber is a narrow annular groove 30 to which the fuel supply pipe 31 is connected, and one end of valve 26 cooperates with an edge of the groove to restrict the flow of fuel from the groove 30 to the chamber 3, from which the fuel flows out through the pipe 32.

For greatest accuracy of operation it is desirable to balance all the forces acting on valve stem 25 in an axial direction except for the force applied to it in one direction by the pneumatic servomotor diaphragm 21, and in the opposite direction by the spring 27. Consequently passage means are provided for equalizing the forces on the valve 26 and the guiding boss 29. As shown in the drawings, such passage means take the form of an axial passage through the valve stem interconnecting the chamber at the side of valve 26 remote from guide boss 29 with the chamber at the side of guide boss 29 remote from valve 26. The opposing pressures on the remote sides of the guide boss and valve are thereby equalized, irrespective of the amount of fuel which may leak by either of these elements from the chamber 3, and as the valve and stem assembly tends to reciprocate the passage 33 will conduct liquid in one direction or the other, both to relieve pressure inequality and to convey liquid commensurate with movement of the piston, piston rod and guide assembly to eliminate any tendency of the valve or guide to compress trapped liquid and thereby hinder movement of the valve. The pressure on the adjacent sides of the valve and guide boss is equalized because both are exposed to the fuel within chamber 3. Any fuel which leaks past the valve stem at the guide boss end of the valve and guide chamber will be released through the passage 34, and may be returned to the source of fuel supply.

From the primary fuel flow regulating unit the fuel flows through pipe 32 to the variable fuel pressure compensating unit 4. This unit includes a valve 40 reciprocable in valve chamber 41, and having a valve guide boss 42 connected to the end of the valve stem 43 opposite valve 40. The valve chamber 41 also has an annular groove 44 to which the pipe 32 connects, and the valve 40 cooperates with one edge of such annular groove to regulate the flow from pipe 32 into the chamber 41. From this valve chamber fuel is discharged through the pipe 45, which leads to the airplane engine. Assuming that the position of valve 26 remains unchanged, the position of valve 40 will be altered automatically to increase its restriction if the pressure in the fuel supply pipe 31 increases, and to decrease its restriction if the pressure in the fuel supply pipe decreases, so that the flow of fuel from pipe 45 will remain unchanged despite such variations in the pressure of the fuel supply.

The position of valve 40 lengthwise of its chamber 41 is regulated by fuel pressure and by a spring acting on the opposite ends of the valve, valve stem and valve guide assembly. Such fuel pressure may be applied directly to the valve 40 through a fuel line 46, 47 connected to one end of the variable fuel pressure compensating unit 4. In the other end of this unit, and reacting between such unit end and the valve guide 42, is the compression spring 48. This spring would be selected so that it would exert a force balancing the pressure exerted on the valve 40 by fuel in the line 47 when the fuel was being supplied under normal pressure and the opening of valve 40 was proper to supply the desired amount of fuel to the engine. For different operating conditions, however, the spring 48 may be replaced with a spring having different resiliency characteristics to alter the position which would be assumed by valve 40 under normal fuel supply pressure conditions.

Particularly in the operation of ramjet engines it may be desirable to alter the fuel to air mixture ratio in order to obtain maximum thrust performance of the engine or maximum economy of operation, and in order to enable the control mechanism to be adjusted regulating valves and by-pass lines may be incorporated in the control. These include a conduit 5 interconnecting the conduit 32, extending between the primary fuel flow regulating unit 2 and the variable fuel pressure compensating unit 4, and the by-pass conduit 46, 47 conducting fuel for establishing pressure control from the supply pipe 31 to the compensating unit 4. From the conduit 5 extends a branch conduit 50 to the end of the variable fuel pressure compensating unit 4 opposite the end to which the conduit 47 is connected. A control valve 51 is provided between conduits 46 and 47, and a control valve 52 is interposed between conduits 5, 50 and conduit 47. These valves may be of the needle valve type to enable them to be regulated closely. By opening valve 52 somewhat and closing to some extent valve 51, fuel will flow to the variable fuel pressure compensating unit 4, not only through the regulating unit 2, but through the pipes 46, 5 and 32. The pressure against the upper side of valve 40 may thus be decreased. The flow through the compensating unit 4 to the engine will thereby be increased both because of the wider opening of valve 40 and the supply of fuel through pipes 46 and 5 in parallel with the fuel flow through the regulating unit 2.

As valve 52 is opened wider to supply more fuel in accordance with the operation described, the fuel to air ratio of the mixture will increase, so that, within limits, greater thrust will be produced by the engine. It should be understood, however, that this particular type of primary fuel flow regulating unit 2 and variable fuel pressure compensating unit 4 are merely illustrative of types of fuel supply regulating mechanism which can be utilized effectively in conjunction with the Mach No. and altitude sensitive mechanism, and other types of pneumatically controlled fuel supply regulating mechanism could be used instead. Capabilities and advantages of the fuel supply regulating mechanism discussed above are discussed in greater detail in my copending application Serial No. 411,870, filed February 23, 1954, for Acceleration and Mach No. Limiting Fuel Control for Aircraft.

As has been mentioned previously, the fuel supply regulating mechanism discussed thus far is sensitive to variations in Mach No. when air is supplied to chamber 20 of the actuating pneumatic servomotor for the fuel flow regulating unit 2. In the absence of other control, therefore, an increase in Mach No. of an airplane equipped with only the controlling mechanism described would continue to increase in Mach No. if such an increase were initiated, such as by descent of the airplane, and, conversely, if a decrease in Mach No. of the airplane were initiated, such as by a climb, the control would effect a reduction in fuel supply, and consequently the Mach No. of the airplane would be reduced further. Without any modifying control, therefore, the operation of the mechanism would tend to aggravate the departure of the airplane from an initial Mach No., whether the initial departure is an increase or a decrease in Mach No.

In order to accomplish the objects of the present invention, therefore, by maintaining a predetermined Mach No. constant for any selected altitude, while at the same time varying the Mach No. in accordance with a predetermined schedule upon change of altitude, there is associated with the control mechanism described above a Mach No. and altitude sensitive modifying control. This control operates by varying the flow of air through conduit 6 which is bled off from the conduit 11 interconnecting the ram air probe 13 and the pneumatic servomotor of the fuel flow regulating unit 2. At any given altitude, if the Mach No. of the airplane should tend to increase, the amount of air escaping from conduit 11 through conduit 6 would increase, so that instead of the servomotor of the fuel flow regulating unit 2 being actuated to open the valve 26, it actually would be operated to close this valve somewhat, thus reducing the supply of fuel so that the Mach No. of the airplane would return to its initial Mach No. Conversely, if the Mach No. of the airplane were reduced inadvertently, the amount of air bled from conduit 11 into conduit 6 would be decreased so that the servomotor of the fuel flow regulating unit 2 would be actuated to open valve 26 somewhat further, thus increasing the fuel supply for producing more engine power to return the airplane to its previous Mach No.

The Mach No. and altitude sensitive control therefore has the dual function of modifying the fuel flow regulating unit for any given altitude so as to maintain substantially constant air Mach No., and further, on a change of altitude, the fuel flow regulating unit 2 will be influenced to alter the fuel flow for establishing a different airplane Mach No. in accordance with a predetermined schedule, and maintaining such new Mach No.

The Mach No. and altitude sensitive modifying control 60 has a valve chamber 61 in it, in which is received the sliding valve 62. This valve includes an inclined metering portion which cooperates with a shoulder of the annular groove 63 formed in the valve chamber 61. Spaced from the tapered metering portion of the valve, and preferably located at one end of the sliding valve body, is the guide boss 64. The other end of the slide valve is secured to the diaphragm 65. An axial bore 66 extends through the valve body so as to equalize the pressures on its opposite ends to balance the effect of air pressure on such opposite valve ends, which are approximately equal in area.

The air bleed line 6 is connected to the valve chamber 61, and a static ambient pressure conduit 67 connects the annular groove 63 to a suitable static pressure location adjacent to the airplane. This conduit is illustrated as passing through the aperture 10 of the engine housing 1 and having a free end projecting outwardly from the housing in a direction transversely of the air stream. To the extent that valve 62 is opened, therefore, air will be bled from the conduit 11 supplied by the ram probe 13 through the pipe 6 past the valve 62 and through conduit 67 to be discharged from its open end described.

The opening of valve 62 relative to annular groove 63 is determined entirely by the displacement of diaphragm 65. Such displacement is effected by the pneumatic pressures exerted on its opposite sides and the resiliency of bellows 7 and 70 connected to such diaphragm. In the structure shown these bellows are mounted directly on the diaphragm 65, which constitutes a common end wall for them, sealing the adjacent ends of such bellows. Such bellows mechanism is received within an encircling casing 71, and the end of bellows 7 remote from diaphragm 65 is sealed to one end of this casing, while the end of bellows 70 remote from the diaphragm is sealed to the other end of such casing. The space between the casing and the bellows mechanism is then evacuated, so that movement of the diaphragm 65 is determined cooperatively by the pressures within bellows 7 and 70, the relative sizes of the areas on opposite sides of diaphragm 65 subjected to such pressures and the resiliency or spring rate of the bellows' walls and any additional spring means which may be incorporated in the modifying control mechanism to act on diaphragm 65 supplemental to the resilience inherent in bellows 7 and 70.

The interior of bellows 7, through aperture 72 in one end of it, is in communication with static air pressure which varies with the altitude at which the airplane is flying, and therefore such bellows constitutes an altitude sensitive element. The interior of bellows 70 is connected by conduit 73, shown as passing through aperture 10 in the engine housing 1, to the impact air probe 74, which projects into the air stream forwardly beyond cowling 12 sufficiently far that its leading end is located well in advance of any shock wave which may be produced by movement of such cowling through the air at sonic or supersonic speeds. The probe 74 and conduit 73 transmit air under ram pressure behind shock wave T to the interior of bellows 70, which is otherwise sealed, and consequently the pressure within this bellows will vary directly in response to changes in Mach No. of the airplane, so that such bellows constitutes a Mach No. sensitive element.

At any given altitude the pressure within bellows 7 will, of course, remain constant, so that movement of diaphragm 65 will be effected only by changes in pressure within bellows 70, resulting from variations in Mach No. If the airplane's Mach No. should tend to increase, the impact pressure on probe 74 would increase, to raise the pressure in the interior of bellows 70. Simultaneously, of course, the pressure on probe 13 would increase correspondingly, tending to increase the pressure in conduit 11 and consequently in the upper chamber 20 of the fuel flow regulating unit servomotor. Increase of pressure within bellows 70, however, would depress diaphragm 65 to move valve 62 toward open position, so that more air would be bled through conduits 6 and 67 from the line 11. By such action of the modifying control 60 the increase in pressure on probe 13 would not result in increased pressure in chamber 20, but, on the contrary, the bleeding of air from line 11 through conduit 6 would be sufficient so that the pressure in this servomotor chamber actually would drop somewhat, to decrease the pressure differential acting on diaphragm 21. Consequently spring 27 would raise valve 26 somewhat toward closed position to reduce the flow of fuel to the engine sufficiently to cause the Mach No. of the airplane to decrease to its previous Mach No.

On the other hand, if the Mach. No. of the airplane should decrease for some reason while the altitude remains constant, the reduction in impact pressure would result in a decrease in pressure within bellows 70, and would tend to cause a reduction of pressure in chamber 20 of the fuel flow control mechanism servomotor. Because of the decreased pressure within bellows 70, however, the diaphragm 65 would be raised slightly by the air pressure within bellows 7, sliding valve 62 toward closed position as shown in the drawing, and thereby decreasing the amount of air which would be bled from line 11 through conduits 6 and 67. Because of such throttling of valve 62 the air supply to chamber 20 of the servomotor actually would be greater than before the decrease in Mach No. so that the increased pressure differential on servomotor diaphragm 20 would move valve 26 toward open position to increase the fuel supply. The additional fuel thus delivered to the engine would, of course, increase its power output to accelerate the airplane until its former Mach No. had been resumed.

When the altitude of the airplane changes, the pressure within the altitude sensitive bellows 7 will be altered correspondingly. If the airplane climbs, so that the pressure within such bellows drops, the diaphragm 65 would tend to be depressed, to draw valve 62 farther open. If the Mach No. of the airplane does not change, however, the impact pressure in probes 13 and 74 would also be reduced, because the air is less dense, so that the individual tendencies would be for the reduced pressure in bellows 70 to result in closing movement of valve 62, and the reduced pressure ratio across diaphragm 21 to result in closing movement of valve 26. Actually, however, the movement of the diaphragm 21 depends not only on the change in impact pressure from probe 13, but also the movement of valve 62 controlling bleeding of air from conduit 11 through conduit 6. As mentioned previously, the movement of diaphragm 65 is influenced not only by the pressures within bellows 7 and 70, but also by the relative areas of diaphragm 65 exposed to the pressures within these bellows and the spring characteristics of the bellows themselves, and of any supplemental spring means which may be provided.

By proper selection of the resiliency characteristics of bellows 7 and 70, and selecting bellows of the proper relative size, either opening or closing movement of valve 62 may be effected in response to an increase in altitude of the airplane. Conversely, by appropriate selection of these factors, the control can be designed to effect either an increase or a decrease of Mach No. with reduction in altitude of the airplane, as may be desired. It will be evident, therefore, that the particular size relationship of bellows 7 and 70 shown in the drawings represents simply one possible selection of diaphragm areas exposed to pressures within the respective bellows.

While, as mentioned, the bellows 7 and 70 can be designed to effect control of the fuel supply so that the Mach No. of the airplane will either increase or decrease as the altitude increases, as may be desired, these elements would not be able to effect an arbitrarily selected speed for each altitude. On the contrary, the general flight characteristics desired for the airplane should be determined, and then desired Mach No.'s for each of two different altitudes should be selected, one, for example, being sea level, and the other being the desired cruising altitude. The proper bellows structure may then be selected to control the fuel supply to the engine to establish these predetermined Mach No.'s at such two particular altitudes, and at altitudes intermediate those for which the desired Mach No. has been selected the airplane Mach No. will change with altitude either increasing or decreasing progressively as may be required, so that the Mach No. will trend toward the Mach No. selected for the airplane at the control altitudes as such altitudes are approached.

When the control structure has thus been selected for any particular set of conditions, a graph plotting altitude against airplane Mach No. may be prepared, representing a definite altitude—Mach No. pattern or schedule for such particular control mechanism. Merely by substitution of one combination of bellows 7 and 70 for another, the control mechanism described may be altered to effect control of the fuel supply for maintaining various Mach No. to altitude schedules within a wide range.

I claim as my invention:

1. Fuel flow mechanism adapted to control the flow of fuel to the engine of an aircraft, comprising fuel flow regulating means including a member movable in one direction to increase the fuel flow and movable in a different direction to decrease the fuel flow, Mach No. sensitive means, and altitude sensitive means, both of said Mach No. sensitive means and said altitude sensitive means being operatively connected to said member for moving it to increase or to decrease the fuel flow in response to movement of said Mach No. sensitive means and said altitude sensitive means as may be required to increase or to decrease the speed of the aircraft for maintaining different predetermined relationships of aircraft Mach No. to altitude corresponding to different altitudes of the aircraft.

2. Fuel flow mechanism adapted to control the flow of fuel to the engine of an aircraft, comprising pneumatic fuel flow regulating means including a member movable in one direction to increase pneumatic pressure in the fuel flow regulating means and movable in a different direction to decrease pneumatic pressure in said fuel flow regulating means for controlling the fuel flow, Mach No. sensitive bellows, and altitude sensitive bellows, both of said Mach No. sensitive bellows and said altitude sensitive bellows being operatively connected to said member for moving it to increase or to decrease the pneumatic pressure in the fuel flow regulating means for varying the fuel flow in response to movement of said Mach No. sensitive bellows and said altitude sensitive bellows as may be required to increase or to decrease the speed of the aircraft for maintaining different predetermined relationships of aircraft Mach No. to altitude corresponding to different altitudes of the aircraft.

3. Fuel flow mechanism adaped to control the flow of fuel to the engine of an aircraft, comprising fuel flow regulating means including a pneumatic servomotor and air supply means operable to supply air to said pneumatic servomotor, and means operable to control the supply of air from said air supply means to said servomotor including a valve, Mach No. sensitive means, altitude sensitive means, and means connecting said Mach No. sensitive means and said altitude sensitive means to said valve and operable to move said valve automatically in opposite directions in response to movement of said Mach No. sensitive means and said altitude sensitive means for controlling the supply of air to said servomotor correspondingly and actuating said fuel flow regulating means to increase or decrease the flow of fuel.

4. Fuel flow mechanism adapted to control the flow of fuel to the engine of an aircraft, comprising fuel flow regulating means including a pneumatic servomotor and air supply means operable to supply air to said pneumatic servomotor, and means operable to control the supply of air from said air supply means to said servomotor including Mach No. sensitive bellows, altitude sensitive bellows, and a valve operatively connected to both of said bellows, and movable in opposite directions by movement of said bellows to increase or decrease, respectively, the supply of air from said air supply means to said servomotor and actuate said fuel flow regulating means correspondingly to increase or decrease the flow of fuel.

5. Fuel flow mechanism adapted to control the flow of fuel to the engine of an aircraft, comprising fuel flow regulating means including a pneumatic servomotor and air supply means operable to supply air to said pneumatic servomotor, and means operable to control the supply of air from said air supply means to said servomotor including Mach No. sensitive bellows, altitude sensitive bellows, and a lengthwise tapered valve operatively connected to both of said bellows and reciprocable lengthwise in opposite directions by movement of said bellows to increase or decrease, respectively, the supply of air from said air supply means to said servomotor progressively with the amount of valve reciprocation and actuate said fuel flow regulating means correspondingly to increase or decrease the flow of fuel.

6. Fuel flow mechanism adapted to control the flow of fuel to the engine of an aircraft, comprising fuel flow regulating means including a pneumatic servomotor and ram air supply means operable to supply air to said pneumatic servomotor, and means operable to control the supply of air from said air supply means to said servomotor including a diaphragm, Mach No. sensitive bellows mounted on one side of said diaphragm, having one end sealed by said diaphragm and subjected internally to impact air pressure, altitude sensitive bellows mounted on the other side of said diaphragm, having one end sealed by said diaphragm and having its interior communicating with ambient atmosphere, and a valve connected to said diaphragm and movable in opposite directions by said diaphragm in response to movement thereof by said bellows to increase or decrease, respectively, the supply of air from said ram air supply means to said servomotor and actuate said fuel flow regulating means correspondingly to increase or decrease the flow of fuel.

7. Fuel flow mechanism adapted to control the flow of fuel to the engine of an aircraft, comprising fuel flow regulating means including a pneumatic servomotor and air supply means operable to supply air to said pneumatic servomotor, and means operable to control the supply of air from said air supply means to said servomotor including a diaphragm, Mach No. sensitive bellows mounted on one side of said diaphragm, having one end sealed by said diaphragm and subjected internally to impact air pressure, altitude sensitive bellows mounted on the other side of said diaphragm, having one end sealed by said diaphragm and having its interior communicating with ambient atmosphere, and a lengthwise tapered valve connected to said diaphragm and reciprocable lengthwise in opposite directions by said diaphragm in response to movement thereof by said bellows to increase or decrease, respectively, the supply of air from said air supply means to said servomotor progressively with the amount of valve reciprocation and actuate said fuel flow regulating means correspondingly to increase or decrease the flow of fuel.

8. Fuel flow mechanism adapted to control the flow of fuel to the engine of an aircraft, comprising fuel flow regulating means, and means operable to control said fuel flow regulating means including a diaphragm movable in one direction to increase the fuel flow and movable in the opposite direction to decrease the fuel flow, Mach No. sensitive bellows mounted on one side of said diaphragm, having one end sealed by said diaphragm and subjected internally to impact air pressure, altitude sensitive bellows mounted on the other side of said diaphragm, having one end sealed by said diaphragm and having its interior communicating with ambient atmosphere, and supporting means for said Mach No. sensitive bellows and said altitude sensitive bellows supporting said bellows for exertion of force thereby on said diaphragm in response to changes of pressure in said respective bellows to move said diaphragm for increasing or decreasing the flow of fuel.

9. Fuel flow mechanism adapted to control the flow of fuel to the engine of an aircraft, comprising fuel flow regulating means including a pneumatic servomotor, air supply means operable to supply air to said pneumatic servomotor, a fuel flow regulating valve movable in opposite directions by said servomotor, a variable fuel pressure compensating valve in series with said fuel flow regulating valve and movable toward closed position automatically in response to an increase in pressure of fuel flowing to said fuel flow regulating valve, and means including Mach No. sensitive bellows, altitude sensitive bellows, and means operatively connecting said Mach No. sensitive bellows and said altitude sensitive bellows to said air supply means, operable to increase or decrease, respectively, the supply of air from said air supply means to said servomotor automatically to increase or decrease correspondingly the flow of fuel past said fuel flow regulating valve in response to movement of said Mach No. sensitive bellows and said altitude sensitive bellows:

References Cited in the file of this patent

UNITED STATES PATENTS

| | | |
|---|---|---|
| 2,330,650 | Weiche | Sept. 28, 1943 |
| 2,445,099 | Wirth | July 13, 1948 |
| 2,512,790 | Cleveland | June 27, 1950 |
| 2,540,594 | Price | Feb. 6, 1951 |
| 2,564,127 | Orr | Aug. 14, 1951 |
| 2,593,536 | Chamberlin et al. | Apr. 22, 1952 |
| 2,638,739 | Barr | May 19, 1953 |
| 2,642,237 | Page et al. | June 16, 1953 |